United States Patent
Chandrasekaran et al.

(10) Patent No.: US 9,278,471 B2
(45) Date of Patent: Mar. 8, 2016

(54) METHOD OF DETECTING A COMPONENT OF AN ARTICLE AND METHOD OF PREPARING A COMPONENT FOR DETECTION

(75) Inventors: Neelakandan Chandrasekaran, Woodbury, MN (US); Michael R. Gorman, Lake Elmo, MN (US); Kristopher K. Biegler, Minneapolis, MN (US); Timothy P. Pariseau, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 778 days.

(21) Appl. No.: 13/323,980

(22) Filed: Dec. 13, 2011

(65) Prior Publication Data

US 2013/0147076 A1 Jun. 13, 2013

(51) Int. Cl.
| | |
|---|---|
| *B29C 47/06* | (2006.01) |
| *G01B 11/14* | (2006.01) |
| *G01B 11/00* | (2006.01) |
| *B29C 47/92* | (2006.01) |
| *B29C 47/00* | (2006.01) |
| *B29C 47/02* | (2006.01) |

(52) U.S. Cl.
CPC .................. *B29C 47/06* (2013.01); *B29C 47/92* (2013.01); *G01B 11/00* (2013.01); *G01B 11/14* (2013.01); *B29C 47/0021* (2013.01); *B29C 47/0057* (2013.01); *B29C 47/028* (2013.01); *B29C 47/065* (2013.01); *B29C 2947/92076* (2013.01); *B29C 2947/92247* (2013.01); *B29C 2947/92304* (2013.01); *B29C 2947/92438* (2013.01); *B29C 2947/92447* (2013.01)

(58) Field of Classification Search
None
See application file for complete search history.

(56) References Cited

U.S. PATENT DOCUMENTS

| 4,435,141 A | 3/1984 | Weisner |
| 4,775,310 A | 10/1988 | Fischer |

(Continued)

FOREIGN PATENT DOCUMENTS

| EP | 1816158 | 8/2007 |
| GB | 2323325 | 9/1998 |

(Continued)

OTHER PUBLICATIONS

ASTM Designation: D-1922-09, "Standard Test Method for Propagation Tear Resistance of Plastic Film and Thin Sheeting by Pendulum Method[1]", 2009, pp. 1-7.

(Continued)

*Primary Examiner* — Jeffrey Wollschlager

(57) ABSTRACT

A method of detecting the presence or position of a first component in an article is disclosed. The first component, which has a predefined response to incident light, includes a microporous film of a semi-crystalline polyolefin and a beta-nucleating agent. The method includes irradiating the article with incident light, detecting light received from the irradiated article; and identifying the predefined response of the first component in the light received from the irradiated article to detect the presence or the position of the first component. A method for preparing a mechanical fastening component for use in an article is also disclosed. The method includes stretching a film backing containing beta-spherulites and having upstanding fastening elements to provide a microporous film backing with sufficient porosity to allow it to be detected when subjected to an inspection system comprising a light detector.

16 Claims, 4 Drawing Sheets

(56) References Cited

U.S. PATENT DOCUMENTS

| | | | |
|---|---|---|---|
| 4,839,131 A | 6/1989 | Cloeren | |
| 4,894,060 A | 1/1990 | Nestegard | |
| 5,107,131 A | 4/1992 | Okada et al. | |
| 5,236,963 A | 8/1993 | Jacoby et al. | |
| 5,359,525 A * | 10/1994 | Weyenberg | 700/124 |
| 5,429,856 A | 7/1995 | Krueger | |
| 5,845,375 A | 12/1998 | Miller | |
| 5,868,987 A | 2/1999 | Kampfer | |
| 6,100,987 A | 8/2000 | Kawakubo | |
| 6,106,922 A | 8/2000 | Cejka | |
| 6,110,588 A | 8/2000 | Perez | |
| 6,132,660 A | 10/2000 | Kampfer | |
| 6,190,594 B1 | 2/2001 | Gorman | |
| 6,191,055 B1 * | 2/2001 | Boyer et al. | 442/80 |
| 6,224,699 B1 * | 5/2001 | Bett et al. | 156/64 |
| 6,251,995 B1 * | 6/2001 | Hesse et al. | 525/191 |
| 6,368,097 B1 | 4/2002 | Miller | |
| 6,368,742 B2 | 4/2002 | Fisher | |
| 6,420,024 B1 | 7/2002 | Perez | |
| 6,513,221 B2 * | 2/2003 | Vogt et al. | 29/429 |
| 6,582,642 B1 | 6/2003 | Buzzell | |
| 6,632,850 B2 | 10/2003 | Hughes | |
| 6,669,887 B2 | 12/2003 | Hilston | |
| 6,708,378 B2 | 3/2004 | Parellada | |
| 6,767,492 B2 | 7/2004 | Norquist | |
| 6,815,048 B2 | 11/2004 | Davidson | |
| 6,885,451 B2 * | 4/2005 | Vogt et al. | 356/431 |
| 6,919,965 B2 * | 7/2005 | Koele et al. | 356/615 |
| 6,927,857 B2 * | 8/2005 | Koele et al. | 356/431 |
| 7,214,334 B2 | 5/2007 | Jens | |
| 7,423,088 B2 | 9/2008 | Mader | |
| 7,682,689 B2 * | 3/2010 | Sadamitsu et al. | 428/317.9 |
| 7,897,078 B2 | 3/2011 | Petersen | |
| 8,182,456 B2 * | 5/2012 | Autran et al. | 604/385.22 |
| 2003/0148091 A1 * | 8/2003 | Ikeda et al. | 428/317.9 |
| 2004/0261231 A1 | 12/2004 | Seth et al. | |
| 2005/0122531 A1 | 6/2005 | Koele | |
| 2005/0215963 A1 * | 9/2005 | Autran et al. | 604/358 |
| 2005/0288510 A1 | 12/2005 | Mader et al. | |
| 2006/0177632 A1 * | 8/2006 | Jacoby | 428/131 |
| 2007/0020448 A1 | 1/2007 | Hubbard | |
| 2007/0082154 A1 | 4/2007 | Ambroise | |
| 2007/0089279 A1 * | 4/2007 | Seth et al. | 24/452 |
| 2008/0000581 A1 | 1/2008 | Nison | |
| 2008/0233373 A1 | 9/2008 | Coburn | |
| 2009/0059229 A1 | 3/2009 | Fukue | |
| 2009/0258212 A1 | 10/2009 | Jacoby | |
| 2010/0301510 A1 | 12/2010 | Coburn | |
| 2011/0147475 A1 | 6/2011 | Biegler | |
| 2011/0151171 A1 | 6/2011 | Biegler | |

FOREIGN PATENT DOCUMENTS

| | | |
|---|---|---|
| GB | 2323327 | 9/1998 |
| GB | 2323328 | 9/1998 |
| WO | WO 93/21262 | 10/1993 |
| WO | WO 2003-025049 | 3/2003 |
| WO | WO 03077813 | 9/2003 |
| WO | WO 2006/023442 | 3/2006 |
| WO | WO 2010-065602 | 6/2010 |
| WO | WO 2011/045683 | 4/2011 |
| WO | WO 2011-097436 | 8/2011 |
| WO | WO 2011-139940 | 11/2011 |

OTHER PUBLICATIONS

ASTM Designation: D-3759/D3759M-05, "Standard Test Method for Breaking Strength and Elongation of Pressure-Sensitive Tape[1]", 2005, pp. 1-7.

ASTM Designation: D-6125-97 (Reapproved 2002), "Standard Test Method for Bending Resistance of Paper and Paperboard (Gurley Type Tester)[1]", 1997, pp. 1-5.

ASTM Designation: E-284-09a, "Standard Terminology of Appearance[1]", 2009, pp. 1-23.

ASTM Designation: F-316-80, "Standard Test Method for Pore Size Characteristics of Membrane Filters for Use With Aerospace Fluids[1]", 1980, pp. 872-878.

Chu, "Microvoid formation process during the plastic deformation of β-form polypropylene", *Polymer*, Aug. 1994, vol. 35, No. 16, pp. 3442-3448.

Chu, "Crystal transformation and micropore formation during uniaxial drawing of β-form polypropylene film", *Polymer*, 1995, vol. 36, No. 13, pp. 2523-2530.

Dow C700-35N PolyPropylene Resin, Medium Impact Copolymer, Dow Plastics Product Information, Mar. 2003, 2 pages.

Jones, "Crystalline Forms of Isotactic Polyprolpylene", Die Makromolekulare Chemie, 1964, vol. 75, No. 1 pp. 134-158.

U.S. Appl. No. 13/324,130, filed Dec. 13, 2011, entitled Structured Film Containing Beta-nucleating Agent and Method of Making the Same.

International Search Report for International Application No. PCT/US2012/069152 (3M File No. 67842WO003, dated Mar. 11, 2013.

International Search Report for International Application No. PCT/US2012/069165(3M File No. 67841WO003, dated Apr. 17, 2013.

Supplementary Partial European Search Report from EP Application No. 1285742, dated Aug. 10, 2015.

* cited by examiner

METHOD OF DETECTING A COMPONENT OF AN ARTICLE AND METHOD OF PREPARING A COMPONENT FOR DETECTION

BACKGROUND

Semi-crystalline polyolefins can have more than one kind of crystal structure. For example, isotactic polypropylene is known to crystallize into at least three different forms: alpha (monoclinic), beta (pseudohexangonal), and gamma (triclinic) forms. In melt-crystallized material the predominant form is the alpha or monoclinic form. The beta form generally occurs at levels of only a few percent unless certain heterogeneous nuclei are present or the crystallization has occurred in a temperature gradient or in the presence of shearing forces. The heterogeneous nuclei are typically known as beta-nucleating agents, which act as foreign bodies in a crystallizable polymer melt. When the polymer cools below its crystallization temperature, the loose coiled polymer chains orient themselves around the beta-nucleating agent to form beta-phase regions. The beta form of polypropylene is a metastable form, which can be converted to the more stable alpha form by thermal treatment and/or applying stress. It is known that micropores can be formed in various amounts when the beta-form of polypropylene is stretched under certain conditions. See, e.g., Chu et al., "Microvoid formation process during the plastic deformation of β-form polypropylene", *Polymer*, Vol. 35, No. 16, pp. 3442-3448, 1994, and Chu et al., "Crystal transformation and micropore formation during uniaxial drawing of β-form polypropylene film", *Polymer*, Vol. 36, No. 13, pp. 2523-2530, 1995.

In other technologies, during the manufacturing of an article it is sometimes desirable to monitor the presence or position of one or more components to be incorporated into the article. For instance, in a largely automated process for manufacturing disposable absorbent products such as diapers and other incontinence products, certain components (e.g., support layers, absorbent pads, elastic components, and fastener components) must be positioned or aligned with respect to each other and/or other components in order to produce an acceptable product. Inspection systems are commonly used to detect the positions of such components during manufacturing. Some exemplary registration inspection systems such as that disclosed in U.S. Pat. No. 5,359,525 (Weyenberg) employ conventional video cameras for capturing visible and ultraviolet light reflected by and/or transmitted through components in order to produce still video images of such components. After producing a video image of an article and its several components, the image can be analyzed to determine whether the components are properly positioned and registered with one another. Another inspection system described in U.S. Pat. No. 6,927,857 (Koele et al.) utilizes infrared detectors to produce an image from a composite article irradiated with light. One or more of the components of the composite article includes an infrared blocker to enhance the degree to which the component can be detected.

SUMMARY

The present disclosure relates to detecting the presence or position of one or more components in an article using irradiation with light and light detectors. At least one of the components includes a microporous film of a semi-crystalline polyolefin that contains a beta-nucleating agent.

In one aspect, the present disclosure provides a method of detecting a presence or a position of a first component in an article. The first component, which has a predefined response to incident light, includes a microporous film comprising a semi-crystalline polyolefin and a beta-nucleating agent. The method includes irradiating the article with incident light, detecting light received from the irradiated article, and identifying the predefined response of the first component in the light received from the irradiated article to detect the presence or the position of the first component. The first component may be a structured film, for example, having a backing and upstanding surface structures such as posts attached to the backing. In some of these embodiments, the backing is microporous while the upstanding posts have a lower level of porosity than the backing. The first component may be a mechanical fastener, for example.

In another aspect, the present disclosure provides a method for preparing a mechanical fastening component for use in an article. The method includes extruding a melt of a polymer composition comprising polypropylene and a beta-nucleating agent in the presence of a tool to provide a film backing with upstanding fastening elements, cooling at least a portion of the film backing to a temperature sufficient to form beta-spherulites, and stretching the film backing containing the beta-spherulites to provide a microporous film backing with sufficient porosity to allow the mechanical fastening component to be detected when the article is subjected to an inspection system comprising a light source and a light detector. In some of these embodiments, the stretching is monoaxial. The some embodiments, the stretching is carried out to provide a total stretch ratio of up to 3:1.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "structured film" refers to a film with other than a planar or smooth surface.

The term "upstanding" refers to surface structures such as posts that protrude from the thermoplastic backing and includes those that stand perpendicular to the backing and those that are at an angle to the backing other than 90 degrees.

The terms "first" and "second" are used in this disclosure in their relative sense only. It will be understood that, unless otherwise noted, those terms are used merely as a matter of convenience in the description of one or more of the embodiments.

The term "machine direction" (MD) as used herein denotes the direction of a running, continuous web of the semi-crystalline polyolefin useful for some embodiments of the method of preparing a mechanical fastening component disclosed herein. When a mechanical fastener patch is a smaller portion cut from a continuous web, the machine direction generally corresponds to the length "L" of the patch. As used herein, the terms machine direction and longitudinal direction are typically used interchangeably. The term "cross-direction" (CD) as used herein denotes the direction which is essentially perpendicular to the machine direction. When a mechanical fastener patch is cut from a continuous web, the cross direction corresponds to the width "W" of the patch.

In the following description, the term microporous film refers to a film that includes multiple pores that have a largest dimension (in some cases, diameter) of up to 10 micrometers. Pore size is measured by measuring bubble point according to ASTM F-316-80. When the "microporous film" is discussed below, it is applicable to the microporous film that is included in the first component, the mechanical fastening component, or both.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1A:
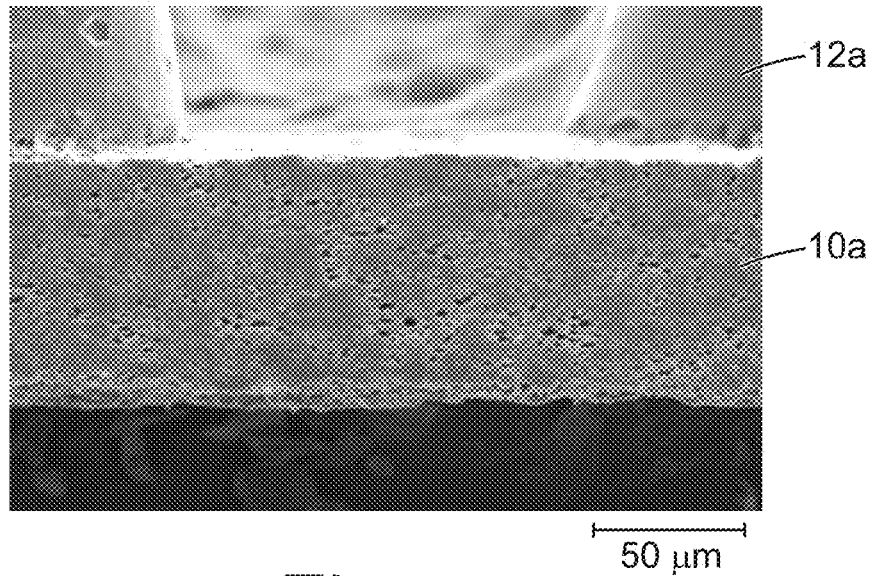
FIG. 1a is a scanning electron micrograph of a cross-section of the structured film of Example 4, useful for practicing the methods according to the present disclosure.

The methods of the present disclosure employ or provide a microporous film including a semi-crystalline polyolefin. Various polyolefins may be useful. Typically the semi-crystalline polyolefin comprises polypropylene. It should be understood that a semi-crystalline polyolefin comprising polypropylene may include a polypropylene homopolymer or a copolymer containing propylene repeating units. The copolymer may be a copolymer of propylene and at least one other olefin (e.g., ethylene or an alpha-olefin having from 4 to 12 or 4 to 8 carbon atoms). Copolymers of ethylene, propylene and/or butylenes may be useful. In some embodiments, the copolymer contains up to 90, 80, 70, 60, or 50 percent by weight of polypropylene. In some embodiments, the copolymer contains up to 50, 40, 30, 20, or 10 percent by weight of at least one of polyethylene or an alpha-olefin. The semi-crystalline polyolefin may also be part of a blend of thermoplastic polymers that includes polypropylene. Suitable thermoplastic polymers include crystallizable polymers that are typically melt processable under conventional processing conditions. That is, on heating, they will typically soften and/or melt to permit processing in conventional equipment, such as an extruder, to form a sheet. Crystallizable polymers, upon cooling their melt under controlled conditions, spontaneously form geometrically regular and ordered chemical structures. Examples of suitable crystallizable thermoplastic polymers include addition polymers, such as polyolefins. Useful polyolefins include polymers of ethylene (e.g., high density polyethylene, low density polyethylene, or linear low density polyethylene), an alpha-olefin (e.g., 1-butene, 1-hexene, or 1-octene), styrene, and copolymers of two or more such olefins. The semi-crystalline polyolefin may comprise mixtures of stereo-isomers of such polymers, e.g., mixtures of isotactic polypropylene and atactic polypropylene or of isotactic polystyrene and atactic polystyrene. In some embodiments, the semi-crystalline polyolefin blend contains up to 90, 80, 70, 60, or 50 percent by weight of polypropylene. In some embodiments, the blend contains up to 50, 40, 30, 20, or 10 percent by weight of at least one of polyethylene or an alpha-olefin.

In some embodiments, the methods of the present disclosure employ a polymeric composition comprising a semi-crystalline polyolefin and having a melt flow rate in a range from 0.1 to 10 decigrams per minute, for example, 0.25 to 2.5 decigrams per minute.

Methods of the present disclosure employ a beta-nucleating agent in the microporous film that includes the semi-crystalline polyolefin. The beta-nucleating agent may be any inorganic or organic nucleating agent that can produce beta-spherulites in a melt-formed sheet comprising polyolefin. Useful beta-nucleating agents include gamma quinacridone, an aluminum salt of quinizarin sulphonic acid, dihydroquinoacridin-dione and quinacridin-tetrone, triphenenol ditriazine, calcium silicate, dicarboxylic acids (e.g., suberic, pimelic, ortho-phthalic, isophthalic, and terephthalic acid), sodium salts of these dicarboxylic acids, salts of these dicarboxylic acids and the metals of Group IIA of the periodic table (e.g., calcium, magnesium, or barium), delta-quinacridone, diamides of adipic or suberic acids, different types of indigosol and cibantine organic pigments, quiancridone quinone, N',N'-dicyclohexil-2,6-naphthalene dicarboxamide (available, for example, under the trade designation "NJ-Star NU-100" from New Japan Chemical Co. Ltd.), antraquinone red, and bis-azo yellow pigments. The properties of the extruded film are dependent on the selection of the beta nucleating agent and the concentration of the beta-nucleating agent. In some embodiments, the beta-nucleating agent is selected from the group consisting of gamma-quinacridone, a calcium salt of suberic acid, a calcium salt of pimelic acid and calcium and barium salts of polycarboxylic acids. In some embodiments, the beta-nucleating agent is quinacridone colorant Permanent Red E3B, which is also referred to as Q-dye. In some embodiments, the beta-nucleating agent is formed by mixing an organic dicarboxylic acid (e.g., pimelic acid, azelaic acid, o-phthalic acid, terephthalic acid, and isophthalic acid) and an oxide, hydroxide, or acid salt of a Group II metal (e.g., magnesium, calcium, strontium, and barium). Such so-called two-component initiators include calcium carbonate combined with any of the organic dicarboxylic acids listed above and calcium stearate combined with pimelic acid. In some embodiments, the beta-nucleating agent is aromatic tri-carboxamide as described in U.S. Pat. No. 7,423,088 (Mäder et al.).

A convenient way of incorporating beta-nucleating agents into a semi-crystalline polyolefin useful for making a microporous film disclosed herein is through the use of a concentrate. A concentrate is typically a highly loaded, pelletized polypropylene resin containing a higher concentration of nucleating agent than is desired in the final film. The nucleating agent is present in the concentrate in a range of 0.01% to 2.0% by weight (100 to 20,000 ppm), in some embodiments in a range of 0.02% to 1% by weight (200 to 10,000 ppm). Typical concentrates are blended with non-nucleated polyolefin in the range of 0.5% to 50% (in some embodiments, in the range of 1% to 10%) by weight of the total polyolefin content of the film. The concentration range of the beta-nucleating agent in the final microporous film may be 0.0001% to 1% by weight (1 ppm to 10,000 ppm), in some embodiments, 0.0002% to 0.1% by weight (2 ppm to 1000 ppm). A concentrate can also contain other additives such as stabilizers, pigments, and processing agents.

The beta-nucleating agent employed in the present disclosure serves the important functions of inducing crystallization of the polymer from the molten state and enhancing the initiation of polymer crystallization sites so as to speed up the crystallization of the polymer. Thus, the nucleating agent may be a solid at the crystallization temperature of the polymer. Because the nucleating agent increases the rate of crystallization of the polymer, the size of the resultant polymer particles, or spherulites, is reduced.

The level of beta-spherulites in the semi-crystalline polyolefin can be determined, for example, using X-ray crystallography and Differential Scanning calorimetry (DSC). By DSC, melting points and heats of fusion of both the alpha phase and the beta phase can be determined in a semi-crystalline polyolefin film. For semi-crystalline polypropylene, the melting point of the beta phase is lower than the melting point of the alpha phase (e.g., by about 10 to 15 degrees Celsius). The ratio of the heat of fusion of the beta phase to the total heat of fusion provides a percentage of the beta-spherulites in a sample. In some embodiments of the method disclosed herein of preparing a component for use in an article, the level of beta-spherulites in at least a portion of the film before stretching to form micropores is at least 10, 20, 25, 30, 40, or 50 percent, based on the total amount of alpha and beta phase crystals in the film. These levels of beta-spherulites may also be found, in some embodiments, in upstanding posts on the microporous backing after stretching.

Additional ingredients may be included in the microporous film in the methods disclosed herein, depending on the desired application. For example, surfactants, antistatic agents, ultraviolet radiation absorbers, antioxidants, organic or inorganic colorants, stabilizers, flame retardants, fragrances, and plasticizers may be included. It is also possible for the microporous film to include an alpha-nucleating agent. Many of the beta-nucleating agents described above have a color. Additional colorants may be added, for example, in the form of a color concentrate or a colored master batch.

In some embodiments, the microporous film useful in the methods disclosed herein can be part of a multilayer or multi-component film. For example, in some embodiments of the method disclosed herein of detecting the presence or position of a first component in an article, the first component comprises a multilayer film with at least one layer comprising the microporous film. A multilayer or multi-component melt stream can be formed by any conventional method. A multilayer melt stream can be formed by a multilayer feedblock, such as that shown in U.S. Pat. No. 4,839,131 (Cloeren). A multi-component melt stream having domains or regions with different components could also be used. Useful multi-component melt streams could be formed by use of inclusion co-extrusion die or other known methods (e.g., that shown in U.S. Pat. No. 6,767,492 (Norquist et al.). In another example, U.S. Pat. No. 5,429,856 (Krueger et al.) describes a process where a polymer melt stream is segmented into multiple substreams and then extruded into the center of another melt stream, which is then formed into a film. This co-extrusion method creates a film that has multiple segmented flows within a matrix of another polymer. In embodiments where the microporous film includes upstanding posts, the upstanding posts may be formed at least partially from a different thermoplastic material than the one predominately forming the backing. Various configurations of upstanding posts made from a multilayer melt stream are shown in U.S. Pat. No. 6,106,922 (Cejka et al.), for example.

It is also possible for the microporous film useful for practicing the methods disclosed herein to be a side-by-side coextruded film. Side-by-side coextruded films can be made by a number of useful methods. For example, U.S. Pat. No. 4,435,141 (Weisner et al.) describes a die with die bars for making a multi-component film having alternating segments in the film cross-direction. A die bar, or bars, at the exit region of the die segments two polymer flows using channels formed on the two outer faces of the die bar. The two sets of segmented polymer flows within these channels converge at a tip of the die bar where the two die bar faces meet. The segmented polymer flows are arranged so that when the two segmented polymer flows converge at the bar tip they form films that have alternating side-by-side zones of polymers. The use of two side-by-side die bars is also contemplated where two faces of adjacent die bars are joined and form a cavity that directs a third set of segmented polymer flows to the tip where the two die bars meet. The three segmented polymer flows converge and form an ABCABC side-by-side-by-side polymer flow. These methods and apparatuses may also be adapted so that a continuous outer skin layer may be coextruded on one or both outer faces of the side-by-side coextruded film as described in U.S. Pat. No. 6,669,887 (Hilston et al.). Another useful method and apparatus for side-by-side co-extrusion, with or without skin layers, is described, for example, in International Patent Application Publication No. WO 2011/097436 (Gorman et al.).

In some embodiments, the microporous film useful in the methods described herein is a coextruded film having side-by-side first and second lanes, wherein the first lanes comprise the semi-crystalline polyolefin and the beta-nucleating agent, and wherein the second lanes comprise a different polymer composition. In some embodiments, the microporous film is comprised in a multilayer film having first and second layers, wherein the first layer comprises the semi-crystalline polyolefin and the beta-nucleating agent, and wherein the second layer comprises a different polymer composition. Suitable thermoplastic materials for the different polymer composition include polyolefin homopolymers such as polyethylene and polypropylene, copolymers of ethylene, propylene and/or butylene; copolymers containing ethylene such as ethylene vinyl acetate and ethylene acrylic acid; polyesters such as poly(ethylene terephthalate), polyethylene butyrate and polyethylene napthalate; polyamides such as poly(hexamethylene adipamide); polyurethanes; polycarbonates; poly(vinyl alcohol); ketones such as polyetheretherketone; polyphenylene sulfide; and mixtures thereof. In some embodiments, the different polymer composition (e.g., in the second lanes or second layer) includes an alpha nucleating agent (e.g., in polypropylene). In some embodiments, the different polymer composition (e.g., in the second lanes or second layer) includes an elastomeric material. The second lanes and second layer need not be microporous.

In some embodiments, microporous films useful in the methods described herein are structured films, for example, including upstanding surface structures such as posts, ridges, or fastening elements. Such structures may be spaced apart on the film. In some embodiments, the surface structures are generally not spaced apart. For example, the structured film may have a series of alternating, abutting upstanding and inverted pyramids in two directions of the film. In other example, the structure film may have a series of alternating, abutting ridges and grooves (that is, peaks and valleys) extending in one direction on the surface of the film. In some embodiments, the film may include one or more unstructured film region separating regions of abutting surface structures. The structured films may include more than one kind of surface structure (e.g., any of the surface structures described above). For example, the structured film may have a combination of continuous ridges and upstanding posts.

The backing and the surface structures are typically integral (that is, formed at the same time as a unit, unitary). The backing is typically in the form of a sheet or web that may have an essentially uniform thickness with upstanding structures directly attached to the backing. In the method of preparing a mechanical fastening component for use in an article according to the present disclosure, a polymer melt including a polyolefin and a beta-nucleating agent is extruded in the presence of a tool to provide a film having upstanding posts on a backing for at least a portion of the film. The structured film is then cooled to a temperature sufficient to form beta-spherulites (e.g., a temperature in a range from 60° C. to 120° C. or 90° C. to 120° C.). In other embodiments, forming the multiple surface structures on a film backing is carried out after cooling at least a portion of the melt (e.g., by embossing or by exposing the film to a tool and heating).

Upstanding posts or ridges on a backing can be made, for example, by conventional extrusion through a die and cast molding techniques. In some embodiments, a polyolefin composition containing the beta-nucleating agent is fed onto a continuously moving mold surface with cavities having the inverse shape of upstanding posts. The polyolefin composition can be passed between a nip formed by two rolls or a nip between a die face and roll surface, with at least one of the rolls having the cavities (i.e., at least one of the rolls is a tool roll). Pressure provided by the nip forces the resin into the cavities. In some embodiments, a vacuum can be used to evacuate the cavities for easier filling of the cavities. The nip has a gap that is typically big enough such that a coherent backing is formed over the cavities. The mold surface and cavities can optionally be air or water cooled to a temperature sufficient to form beta-spherulites (e.g., a temperature in a range from 60° C. to 120° C. or 90° C. to 120° C.). In these embodiments, cooling at least a portion of the film to a temperature sufficient to form beta-spherulites is carried out in the presence of the tool that forms the upstanding posts. The integrally formed backing and upstanding posts can then be stripped from the mold surface such as by a stripper roll.

Suitable tool rolls for making upstanding posts on a backing can be made, for example, by forming (e.g., by computer numerical control with drilling, photo etching, using galvanic printed sleeves, laser drilling, electron beam drilling, metal punching, direct machining, or lost wax processing) a series of holes having the inverse shape of the upstanding posts into the cylindrical face of a metal mold or sleeve. Other suitable tool rolls include those formed from a series of plates defining a plurality of post-forming cavities about its periphery such as those described, for example, in U.S. Pat. No. 4,775,310 (Fischer). Cavities may be formed in the plates by drilling or photoresist technology, for example. Still other suitable tool rolls may include wire-wrapped rolls, which are disclosed along with their method of manufacturing, for example, in U.S. Pat. No. 6,190,594 (Gorman et al.). The exposed surface of the mold, sleeve, plate, or wire may be coated to impart surface properties such as increased wear resistance, controlled release characteristics, and controlled surface roughness. The coating, if present, is typically selected so that the adhesion of the polyolefin composition to the tool roll is less than the cohesion of the polyolefin composition at the time of the removal of the thermoplastic backing from the tool roll.

Another exemplary method for forming a backing with upstanding posts includes using a flexible mold belt defining an array of upstanding post-shaped cavities as described in U.S. Pat. No. 7,214,334 (Jens et al.). The mold belt is trained about first and second rolls. A source of molten polyolefin composition can be arranged to deliver the polyolefin composition to the mold belt. The apparatus is constructed to force the plastic resin into the post-shaped cavities of the belt under pressure in a gap to mold the array of upstanding posts while forming the backing.

The upstanding posts, which may be made, for example, by any of the methods described above, may have a shape that tapers, for example, from base portion attached to the backing to a distal tip. The base portion may have a larger width dimension than the distal tip, which may facilitate the removal of the post from the mold surface in the methods described above.

In some embodiments, the distal tips of the upstanding posts that are formed according to any of the above methods are deformed to form caps with loop-engaging overhangs. The term "loop-engaging" as used herein relates to the ability of a mechanical fastener element (i.e., hook element) to be mechanically attached to a loop material. Generally, hook elements with loop-engaging heads have a cap shape that is different from the shape of the post. The loop-engageability of hook elements may be determined and defined by using standard woven, nonwoven, or knit materials. A region of posts with loop-engaging caps generally will provide, in combination with a loop material, at least one of a higher peel strength, higher dynamic shear strength, or higher dynamic friction than a region of posts without loop-engaging caps.

A combination heat and pressure, sequentially or simultaneously, may be used to deform the distal tips of the posts to form caps. In some embodiments, deforming comprises contacting the distal tips with a heated surface. The heated surface may be a flat surface or a textured surface such as that disclosed in U.S. Pat. No. 6,708,378 (Parellada et al.) or U.S. Pat. No. 5,868,987 (Kampfer et al.). In some embodiments, wherein the backing with upstanding posts is a web of indefinite length, the deforming comprises moving the web in a first direction through a nip having a heated surface member and an opposing surface member such that the heated surface member contacts the distal tips. In these embodiments, the heated surface may be, for example, a capping roll. In some embodiments, the surface used to contact the distal tips is not heated. In these embodiments, the deformation is carried out with pressure and without heating. In some embodiments, the heated surface may be a heated roll opposite a curved support surface forming a variable nip having a variable nip length as described, for example, in U.S. Pat. No. 6,368,097 (Miller et al.). The curved support surface may curve in the direction of the heated roll, and the heated roll may include a feeding mechanism for feeding the backing with upstanding posts through the variable nip to compressively engage the web between the heated roll and the support surface.

In addition to posts, other surface structures may be made according to any of the methods described above. Exemplary useful surface structures include continuous ridges, pyramids (e.g., triangular pyramids or square pyramids), cones, hemispherical bumps, and cubes. The structures may be positive structures that protrude from the surface of the film or may be considered depressions in the surface of the film. Depressions in the surface of the film may be made with a variety of useful shapes. As described above, the surface structures may be "loop-engaging", and self-engaging surface structures may also be useful.

While any of the tool rolls mentioned above may be designed to form a variety of surface structures as well as posts on a backing, another suitable method for forming a backing with upstanding surface structures is profile extrusion, which is described, for example, in U.S. Pat. No. 4,894,060 (Nestegard). Using this method a flow stream of the polyolefin composition containing the beta-nucleating agent can be passed through a patterned die lip (e.g., cut by electron discharge machining) to form a web having downweb ridges. The ridges can be optionally transversely sliced at spaced locations along the extension of the ridges to form upstanding posts with a small separation caused by the cutting blade. It should be understood that "upstanding posts" do not include such ridges before they are cut. The ridges themselves would also not be considered "loop-engaging" because they would not be able to engage loops before they are cut and stretched. However, the patterned die lip may be considered a tool to ultimately provide the film backing having upstanding fastening elements, which are loop-engaging, in the method disclosed herein of preparing a mechanical fastening component for use in an article. The separation between upstanding posts form by transversely slicing the ridges would be increased by stretching the film in the direction of the ridges using one of the stretching methods described below. In some embodiments, the method disclosed herein of preparing a mechanical fastening component for use in an article does not include cutting ridges (e.g., made by profile extrusion).

In addition to the continuous methods described above, it is also envisioned that films comprising backings with upstanding posts can be prepared using batch processes (e.g., single piece injection molding). The backing may have any suitable dimension, but length (L) and width (W) dimensions of at least 10 cm may be useful.

In embodiments where the microporous films useful in the methods described herein include upstanding posts on a microporous backing, the upstanding posts, which may be made, for example, by any of the methods described above, may have a variety of cross-sectional shapes. For example, the cross-sectional shape of the post may be a polygon (e.g., square, rectangle, hexagon, or pentagon), which may be a regular polygon or not, or the cross-sectional shape of the post may be curved (e.g., round or elliptical).

In the methods disclosed herein, the microporous film may have a variety of thicknesses. For example, the initial thickness (i.e., before any stretching) of the film may be up to about 750, 500, 400, 250, or 150 micrometers, depending on the desired application. In some embodiments, the initial thickness of the film is at least about 50, 75, or 100 micrometers, depending on the desired application. In some embodiments, the initial thickness of the film is in a range from 50 to about 225 micrometers, from about 75 to about 200 micrometers, or from about 100 to about 150 micrometers. The film may have an essentially uniform cross-section, may include upstanding posts on a backing, or may have other surface structures instead of or in addition to upstanding posts, which may be imparted, for example, by at least one of the tool rolls described above. The initial film thicknesses are exclusive of any upstanding surface structures on the backing.

In some embodiments wherein the microporous backing described herein includes upstanding surface structures (e.g., posts or ridges), the upstanding surface structures have a maximum height (above the backing) of up to 3 millimeters (mm), 1.5 mm, 1 mm, or 0.5 mm and, in some embodiments a minimum height of at least 0.05 mm, 0.075 mm, 0.1 mm, or 0.2 mm. In some embodiments, the posts have aspect ratio (that is, a ratio of height over a width dimension) of at least about 2:1, 3:1, or 4:1. The aspect ratio may be, in some embodiments, up to 10:1. For upstanding posts with caps, the caps are typically larger in area than the cross-sectional area of the posts. A ratio of a width dimension of the cap to the post measured just under the cap is typically at least 1.5:1 or 3:1 and may be up to 5:1 or greater. The capped posts are typically shorter than the posts before capping. In some embodiments, the capped posts have a height (above the backing) of at least 0.025 mm, 0.05 mm, or 0.1 mm and, in some embodiments, up to 2 mm, 1.5 mm, 1 mm, or 0.5 mm. The posts, which may be capped or not, may have a cross-section with a maximum width dimension of up to 1 (in some embodiments, up to 0.75, 0.5, or 0.45) mm. In some embodiments, the posts have a cross-section with a width dimension between 10 µm and 250 µm. The term "width dimension" should be understood to include the diameter of a post with a circular cross-section. When the post has more than one width dimension (e.g., in a rectangular or elliptical cross-section shaped post or a post that tapers as described above), the aspect ratio described herein is the height over the largest width dimension.

Where they are included, the upstanding posts are typically spaced apart on the backing. The term "spaced-apart" refers to posts that are formed to have a distance between them. The bases of "spaced-apart" posts do not touch each other before or after stretching the backing when the backing is in an unbent configuration. In the film useful for practicing the methods disclosed herein, the spaced-apart upstanding posts have an initial density (i.e., before stretching the film) of at least 10 per square centimeter ($cm^2$) (63 per square inch $in^2$). For example, the initial density of the posts may be at least 100/$cm^2$ (635/$in^2$), 248/$cm^2$ (1600/$in^2$), 394/$cm^2$ (2500/$in^2$), or 550/$cm^2$ (3500/$in^2$). In some embodiments, the initial density of the posts may be up to 1575/$cm^2$ (10000/$in^2$), up to about 1182/$cm^2$ (7500/$in^2$), or up to about 787/$cm^2$ (5000/$in^2$). Initial densities in a range from 10/$cm^2$ (63/$in^2$) to 1575/$cm^2$ (10000/$in^2$) or 100/$cm^2$ (635/$in^2$) to 1182/$cm^2$ (7500/$in^2$) may be useful, for example. The spacing of the upstanding posts need not be uniform.

Figure 1B:
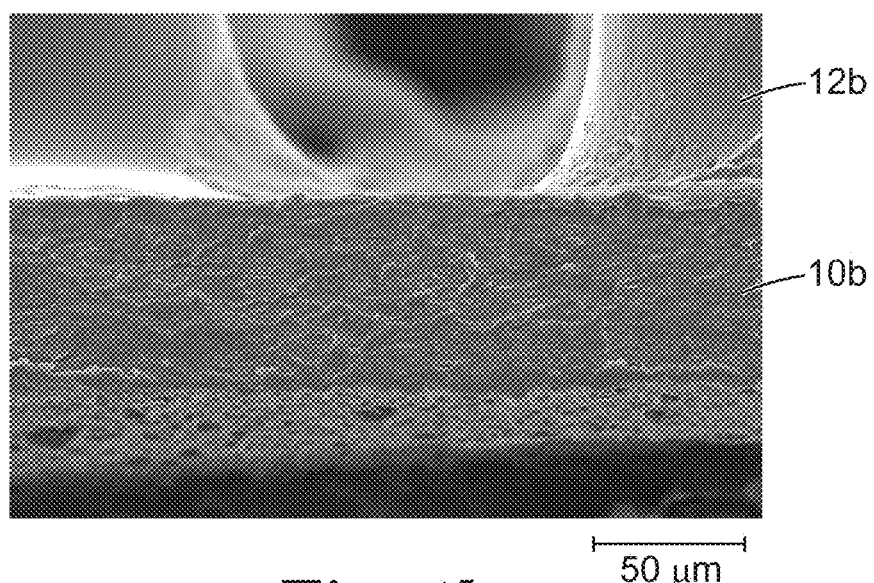
FIG. 1b is a scanning electron micrograph of a cross-section of the structured film of Comparative Example 4, which is a stretched structured film containing no beta-nucleating agent.

The method of preparing a mechanical fastening component for use in an article includes stretching the backing to provide micropores in the backing. Also, the method of detecting at least one of a presence or a position of a first component in an article utilizes a microporous backing generally formed by such stretching. Without wanting to be bound by theory, it is believed that when the film is stretched in at least one direction, for example, the semi-crystalline polypropylene converts from the beta-crystalline structure to the alpha-crystalline structure in the backing, and micropores are formed in the film backing. Any upstanding posts are typically not affected by the stretching or are affected to a much lesser extent than the film backing and therefore retain beta-crystalline structure and are generally not microporous. A scanning electron microscope image of a cross-section of structured film according to and/or made according to the present disclosure after it is stretched is shown in FIG. 1. FIG. 1 shows that the backing 10a is porous while the upstanding posts 12a are not microporous. Similarly, any upstanding ridges (e.g., continuous ridges) on the backing would be affected to a much lesser extent than the film backing and therefore would be less microporous than the film backing. The direction of stretching can affect the level of microporosity in structured film embodiments having continuous structures (e.g., continuous ridges), depending on whether the direction of stretching is the same or transverse to the continuous structures. In embodiments where the surface structures are not spaced apart (that is, abutting), the level of microporosity in the surface structures may be higher at their abutting edges than in their centers (e.g., at their apexes).

Stretching the film disclosed herein (e.g., to provide the microporous film) can be carried out on a web biaxially or monoaxially. Biaxial stretching means stretching in two different directions in the plane of the backing. Typically, but not always, the first direction is the longitudinal direction "L", and the second direction is the width direction "W". Biaxial stretching can be performed sequentially by stretching the thermoplastic backing, for example, first in one of the first or second direction and subsequently in the other of the first or second direction. Biaxial stretching can also be performed essentially simultaneously in both directions. Monoaxial stretching refers to stretching in only one direction in the plane of the backing. Typically, monoaxial stretching is performed in one of the "L" or "W" direction but other stretch directions are also possible.

In some embodiments of the method disclosed herein of preparing a mechanical fastening component for use in an article, the stretching increases at least one of the backing's length ("L") or width ("W") at least 1.2 times (in some embodiments, at least 1.5, 2, or 2.5 times). In some embodiments, the stretching increases both of the backing's length ("L") and width ("W") at least 1.2 times (in some embodiments, at least 1.5, 2, or 2.5 times). In some embodiments, the stretching increases at least one of the backing's length ("L") or width ("W") up to 5 times (in some embodiments, up to 2.5 times). In some embodiments, the stretching increases both of the backing's length ("L") and width ("W") up to 5 times (in some embodiments, up to 2.5 times). It has unexpectedly been found that even monoaxial stretching at a stretch ratio of up to 3, 2.5, 2.25, 2.2, or even 2 can provide high levels of porosity and opacity even in the absence of other cavitating agents such as calcium carbonate. We have found that stretching a structured film of polypropylene and a beta nucleating agent at low stretch ratios in the range of 2:1 to 2.5:1 results in a film with a uniform appearance. The uniform appearance of the film can be achieved even when upstanding posts, which may have caps, are the only surface structures elements on the film. In other words, the film does not require any stretch limiting formations as described in U.S. Pat. No. 6,582,642 (Buzzell et al.).

Stretching the film to provide microporosity useful for the methods disclosed herein can be carried out in a variety of ways. When the film is a web of indefinite length, for example, monoaxial stretching in the machine direction can be performed by propelling the structured film over rolls of increasing speed. A versatile stretching method that allows for monoaxial, sequential biaxial, and simultaneous biaxial stretching of the structured film employs a flat film tenter apparatus. Such an apparatus grasps the thermoplastic web using a plurality of clips, grippers, or other film edge-grasping means along opposing edges of the structured film in such a way that monoaxial, sequential biaxial, or simultaneous biaxial stretching in the desired direction is obtained by propelling the grasping means at varying speeds along divergent rails. Increasing clip speed in the machine direction generally results in machine-direction stretching. Means such as diverging rails generally results in cross-direction stretching. Monoaxial and biaxial stretching can be accomplished, for example, by the methods and apparatus disclosed in U.S. Pat. No. 7,897,078 (Petersen et al.) and the references cited therein. Flat film tenter stretching apparatuses are commercially available, for example, from Bruckner Maschinenbau GmbH, Siegsdorf, Germany.

Stretching the film to provide microporosity useful for the methods disclosed herein is typically performed at elevated temperatures, for example, up to 150° C. Heating the structured film may allow the backing to be more flexible for stretching. Heating can be provided, for example, by IR irradiation, hot air treatment or by performing the stretching in a heat chamber. In some embodiments, heating is only applied to one surface of the backing. For example, in a structured film, heat may be applied only to the surface opposite the surface structures to minimize any damage to the surface structures that may result from heating. In these embodiments, only rollers that are in contact with one surface of the backing are heated, for example. In some embodiments, stretching the film is carried out at a temperature range from 50° C. to 130° C. As shown in the Examples, below, grayscale intensity and light transmittance and reflectance in the stretched structured films disclosed herein have been found to increase as the stretch temperature decreases. In some embodiments, the temperature range is from 50° C. to 110° C., 50° C. to 90° C., or 50° C. to 80° C. In some embodiments, stretching at lower temperatures may be possible, for example, in a range from 25° C. to 50° C. It has unexpectedly been found that stretching structured films disclosed herein can be carried out at lower temperatures than flat films including a beta-nucleating agent previously described. For example, structured films of a semi-crystalline polyolefin containing a beta-nucleating agent can even be stretched at a temperature of up to 70° C. (e.g., in a range between 50° C. and 70° C. or between 60° C. and 70° C.).

In embodiments where upstanding posts are present on a microporous backing, the density of the upstanding posts after stretching is less than the initial density of the upstanding posts. In some embodiments of the method of preparing a mechanical fastening component for use in an article, the upstanding posts have a density after stretching of at least 2 per square centimeter ($cm^2$) (13 per square inch $in^2$). For example, the density of the posts after stretching may be at least $62/cm^2$ ($400/in^2$), $124/cm^2$ ($800/in^2$), $248/cm^2$ ($1600/in^2$), or $394/cm^2$ ($2500/in^2$). In some embodiments, the density of the posts after stretching may be up to about $1182/cm^2$ ($7500/in^2$) or up to about $787/cm^2$ ($5000/in^2$). Densities after stretching in a range from $2/cm^2$ ($13/in^2$) to $1182/cm^2$ ($7500/in^2$) or $124/cm^2$ ($800/in^2$) to $787/cm^2$ ($5000/in^2$) may be useful, for example. Again, the spacing of the posts need not be uniform.

Upon stretching, the micropores formed in the backing along with stress-whitening typically provide an opaque film. In some embodiments of the method of preparing a mechanical fastening component for use in an article according to the present disclosure, stretching the film containing beta-spherulites provides an increase in opacity in the film of at least ten percent. In some embodiments, this stretching provides an increase in opacity of at least 15, 20, 25, or 30 percent. The increase in opacity may be, for example, up to 90, 85, 80, 75, 70, 65, 60, 55, or 50 percent. The initial opacity in the film is affected, for example, by the thickness of the film. Stretching the film typically results in a decrease in thickness, which would typically lead to a decrease in opacity. However, in the films useful for practicing the present disclosure, the stress whitening and micropore formation leads to an increase in opacity. In these embodiments, opacity is measured using a spectrophotometer with the "L" value measured separately against a black background and against a white background, respectively, using a LabScan XE spectrophotometer (Hunterlab, Reston, Va.) according to ASTM E-284. Samples are placed in a specimen port, and for each background, the measurement is taken twice, with the sample rotated 90 degrees, and an average of the two readings is taken. The opacity is calculated as (L measured against the black background/L measured against the white background) times 100. The "L" value is one of three standard parameters in the CIELAB color space scale established by the International Commission on Illumination. "L" is a brightness value, ranging from 0 (black) to 100 (highest intensity). A percentage change in opacity that results from stretching the film is calculated by [(opacity after stretching−opacity before stretching)/opacity before stretching] times 100.

Figure 2A:
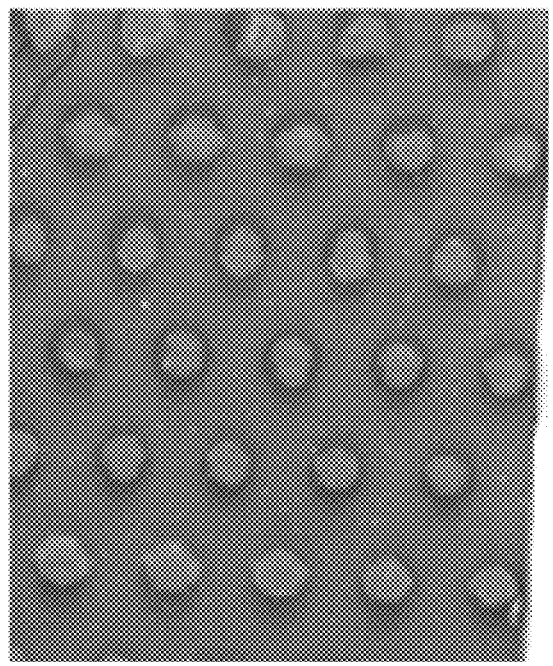
FIG. 2a is an optical microscope image of a top view of an exemplary structured film comprising a beta-nucleating agent where the film has not been stretched.
Figure 2B:
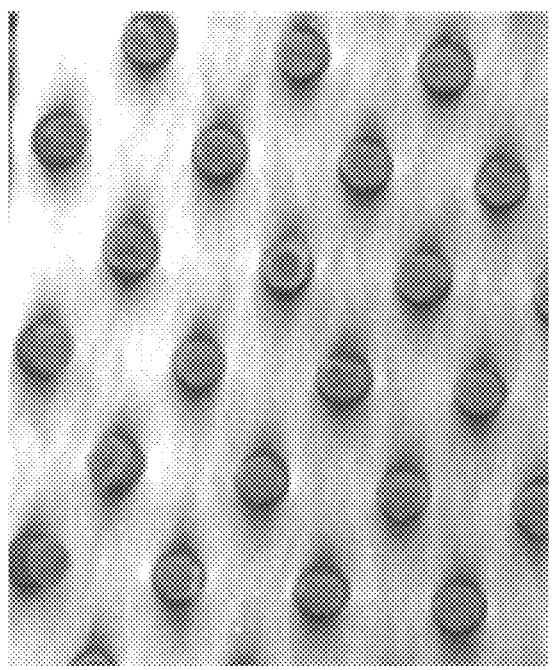
FIG. 2b is an optical microscope image of a top view of an exemplary microporous film useful as a first component in the methods according to the present disclosure, where the film shown in FIG. 2a has been stretched.

A visible change in appearance between a polyolefin film comprising a beta-nucleating agent before stretching and after stretching is shown in FIGS. 2a and 2b, respectively. In FIG. 2b, the backing appears whiter in the optical microscope image than the backing in FIG. 2a due to the microporosity and stress whitening resulting from stretching. The surface structures, which are upstanding posts, do not appear to visibly change. As described above, any upstanding posts do not appear to be affected by stretching and become much less microporous upon stretching (if at all) than the backing.

The opacity of the microporous film relates to its ability to transmit light. As used herein, the term "light" refers to electromagnetic radiation, whether visible to the unaided human eye or not. Ultraviolet light is light having a wavelength in a range from about 250 nanometers (nm) to 380 nm. Visible light is light having a wavelength in a range from 380 nm to 700 nm. Infrared light has a wavelength in a range from about 700 nm to 300 micrometers. Stretching a film comprising a semi-crystalline olefin with beta-spherulites lowers its transmission to ultraviolet, visible, and infrared light. Similarly, stretching a film comprising a semi-crystalline olefin with beta-spherulites increases its reflection of ultraviolet, visible, and infrared light. The micropores in the stretched film tend to scatter light in the ultraviolet, visible, and infrared ranges.

In some embodiments of the methods described herein, the first component and/or the microporous film has a percent transmittance in a range from 8 percent to 60 percent in a wavelength range of 250 nm to 2250 nm. Before stretching, the same component or film may have a percent transmittance in a range from about 40 percent to about 80 percent in the same wavelength range. In some embodiments, as shown in the Examples, below, an exemplary polyolefin film including a beta-nucleating agent has a percent transmittance that decreases at least 25% and up to 60%, 70%, or 75% upon stretching depending on the degree of stretching, the stretch temperature, and the wavelength range (e.g., ultraviolet, visible, or infrared). In some embodiments of the methods described herein, the first component and/or the microporous film has a percent reflectance in a range from about 20 percent to about 80 percent in a wavelength range of 250 nm to 2250 nm. Before stretching, the same component or film may have a percent reflectance in a range from 3 percent to about 30 percent in the same wavelength range. In some embodiments, as shown in the Examples, below, an exemplary polyolefin film including a beta-nucleating agent has a percent reflectance that increases at least 55% or 80% and up to 150%, 200%, or 250% upon stretching depending on the degree of stretching, the stretch temperature, and the wavelength range. That is, the percent reflectance has a percent increase of at least 55% or 80% and up to 150%, 200%, or 250% upon stretching.

In some embodiments of the method of preparing a mechanical fastening component for use in an article according to the present disclosure, stretching the film containing beta-spherulites provides a decrease in the grayscale value of the film of at least twenty percent. In some embodiments, this stretching provides a decrease in a grayscale value of at least 25, 30, 40, or 50 percent. The decrease in grayscale value may be, for example, up to 90, 85, 80, 75, 70, 65, or 60 percent. For these embodiments, the grayscale value is measured in transmission mode using the method described in the Example section, below. Stretching a film typically results in a decrease in thickness, which would typically lead to an increase in the grayscale value measured in transmission mode. However, in the films useful for practicing the present disclosure, the stress whitening and micropore formation leads to decrease in transmission mode grayscale values. A percentage change in grayscale value that results from stretching the film is calculated by [(grayscale value after stretching−grayscale value before stretching)/grayscale value before stretching] times 100.

In some embodiments of the method disclosed herein of detecting a presence or a position of a first component of an article, the microporous film and/or the first component has a grayscale value of up to 40 (in some embodiments, up to 35, 30, 25, 20 or 15). For these embodiments, the grayscale value is measured in transmission mode using the method described in the Examples, below. The grayscale values for the microporous films useful for practicing the present disclosure are comparable or better than those achieved for polyolefin films of similar composition but incorporating conventional amounts of IR blocking agents such as titanium dioxide.

For more information regarding microporous films useful for practicing the present disclosure and their properties, see U.S. Pat. App. Pub. No. 2013/0149488 (Chandrasekaran et al.), incorporated by reference herein in its entirety.

The ability of the microporous films disclosed herein to block the transmission of visible and infrared light allows them to be detected in inspection systems that rely upon shining a light onto a substrate and detecting the amount of light received from the area of the irradiated substrate. For example, in the manufacture of an article, the presence or position of a microporous film disclosed herein or a portion thereof incorporated into the article can be detected because of its ability to block ultraviolet, visible, and/or infrared light. The article may be, for example, a disposable absorbent article, and the first component may be a mechanical fastening patch to be incorporated into the disposable absorbent article.

The response of the first component to irradiation with light is evaluated to identify a predefined response. Subsequently (e.g., during manufacturing), an article can be irradiated, and the light received from the irradiated article can be detected and analyzed for the predefined response of the first component. When the first component is present in the irradiated article, it will alter the article's response to the incident light, by blocking incident light such as by scattering or reflecting light at one or more particular wavelengths. One or more variations will occur in the detected light (such as wavelength or intensity variations), which are indicative of the first component's presence or absence.

In some embodiments of the method of detecting at least one of a presence or a position of a first component in an article, the method includes identifying a position where there is a variation in the produced image corresponding to an edge of the first component in the article. The position of the variation identified in the produced image can be compared with reference data to thereby determine whether the first component of the article is properly positioned.

Irradiating the article with incident light is typically carried out with a light source. The light source may be any device capable of emitting radiation in the ultraviolet, visible, and/or infrared spectrum (i.e., radiation having a wavelength between about 250 nanometers and 300 micrometers). Some examples of light sources suitable for certain embodiments of the present disclosure include infrared LEDs, mercury vapor lamps, argon lamps, arc lamps, lasers, etc. In some embodiments, the incident light comprises infrared light. In some of these embodiments, the incident light is in the range of about 700 nanometers to 1200 nanometers. In some embodiments, the incident light has a wavelength of about 940 nanometers. In these embodiments, the light source may be an infrared LED having a nominal value of 940 nanometers.

Detecting light received from the composition can be carried out with a variety of suitable detectors. For example, any device having one or more sensor elements (including a matrix of sensor elements) capable of sensing ultraviolet, visible, and/or infrared radiation may be useful. Suitable detectors include vision inspection cameras, which are capable of detecting visible light, ultraviolet light, and infrared light of wavelengths up to about 1200 nanometers, line scan cameras capable of building an image one line at a time from light received from an article as the article is moved relative thereto, as well as any other device capable of producing a one, two, or three dimensional image from received light including a charge coupled device ("CCD").

The light sources and the detectors useful for practicing the present disclosure may include fiber optic devices in some embodiments of the methods disclosed herein, such as to precisely irradiate or detect light from a specific component or region in an article. The light source may also be used in combination with a diffuser, which may render more uniform the light emanating from the light source. In some embodiments, the detector includes a filter for removing (i.e., blocking) certain wavelengths of light, such as ambient wavelengths. Such filters include low-pass filters which remove radiation above a predefined wavelength, high-pass filters which remove radiation below a predefined wavelength, band-pass filters which remove all radiation except that having a wavelength within a predefined range, and combinations thereof. In some embodiments, the detector may include a high pass filter having a nominal value of about 830 nanometers for removing visible and ultraviolet light. Alternatively or additionally, one or more shrouds may be employed around the detector to shield the detector from extraneous radiation sources (e.g., ceiling lights or natural light).

For any given embodiment of the method disclosed herein of detecting at least one of the presence or position of a first component in an article, the combination of light source (including its intensity and wavelength(s)), detector, light source/detector geometry, detector filter (if any), and level of microporosity (as described below) can be selected as necessary to enhance detection of components of interest in an article.

There may be constant or intermittent (e.g., periodic) movement of the article relative to the system useful for carrying out the detection method described herein. In some embodiments, the article is moved into a field of view of the detector for inspection. In other embodiments, the detector may be moved (or have components which are moved, such as in a scanning motion) for inspection of the article. In some embodiments, the article is part of a moving collection of articles. In some embodiments, at least some of the articles in the moving collection of articles are interconnected.

The light source may emit light continuously or intermittently. If the light source emits continuously, the detector may be shuttered (electronically or otherwise) to prevent blurring of the image due to high speed movement of the article, if applicable. If the light source emits radiation intermittently, the detector is preferably synchronized with the light source so as to detect a response contemporaneously with the irradiating of the article.

In some embodiments, the article is positioned between one or more light sources and one or more detectors. Thus, the light source irradiates the article from one side thereof, and the response that is produced is received by the detector from the opposite side of the article. In these embodiments, typically the incident light is generated from a light source, and the light received from the irradiated article is transmitted through the article to a detector.

In other embodiments, one or more (e.g., two) light sources can be positioned adjacent a detector on opposite sides thereof, and on a same side of the article as the detector. Thus, the light sources irradiate the article from a top side thereof, and the response that is produced is received by the detector from the top side of the article (e.g., from light scattered or reflected by the first component and possibly other components of the article).

In some embodiments of the method of detecting at least one of a presence or a position of a first component in an article, the method includes irradiating an article with incident light as the article moves relative to a light detector. In some embodiments, a single sensor element is used as the detector to detect the light received from the article as it moves relative to the sensor element, where a high detector output level indicates the absence of the first component and a low detector output level indicates the presence of the first component (or vice versa).

In some embodiments of the method of detecting the presence or position of a first component in an article, detecting includes producing an image from the light received from the irradiated article. In other words, the detector may produce an image from light received from the irradiated article. In such a case, the method typically includes identifying the predefined response of the first component in the produced image (e.g., by detecting variations, such as contrast variations, indicative of the first component's presence) to detect the presence or position of the first component.

In some embodiments, a system useful for carrying out the method of detecting at least one of a presence or a position of a first component in an article includes a light source for irradiating an article and a detector that, in some embodiments, produces a two- or three-dimensional image from light transmitted through or reflected from the article. In these embodiments, the detector is typically operatively connected to an image analyzer, and, in some embodiments, the image analyzer is operatively connected to a comparator. The image analyzer useful for practicing the method disclosed herein may be, for example, a programmable digital computer, and the comparator may be implemented in a variety of hardware and software configurations. Additionally, these various components of the system may be implemented singly or in combination. For example, the comparator and the image analyzer may be implemented within a single programmable computer.

An image analyzer can be configured to receive an image produced by the detector. The image will include variations therein which correspond to variations in light levels (and/or wavelengths) received by the detector from the irradiated article. In some embodiments, the image produced by the detector is a black-and-white image in which light level variations are depicted in varying grayscale levels. In other embodiments, such variations may be depicted in the image in another manner, such as in the form of color variations. Regardless of their form, the image analyzer can be configured for identifying one or more variations in the produced image each corresponding to the presence or position of the first component in the article. Identified positions, for example, can then be compared by the comparator with reference data (e.g., ideal or predetermined position data) to determine whether the positions of components in the article are acceptable. For example, the comparator may determine whether the edge position of a particular component is precisely where it is supposed to be, or whether it falls within a predetermined range of acceptable positions.

In embodiments of the method of detecting a position of a first component in an article, the image analyzer can be configured to determine the positions of variations in the image produced by the detector, and thus the edge positions of components in the article, either as fixed positions or relative positions, or a combination of both. Thus, the image analyzer may determine the edge position of an article component, for example, relative to a fixed point, line, or region of the image, relative to another component or the edge of another component in the image, or relative to a registration mark on a component of the article. As one example, the image analyzer may first determine the edge position of a first component as a fixed position (e.g., in terms of x,y coordinates or, in the case of a three dimensional image, in terms of x, y, z coordinates), and then determine the edge position of a second component (or another edge position of the first component) relative to the previously determined edge position of the first component.

The comparator is configured, in some embodiments, to compare positions identified by the image analyzer with reference data (e.g., predetermined fixed and/or relative position data, as applicable) to thereby determine whether one or more components are properly positioned in the article. Depending on the outcome of such comparison(s), the comparator may output one or more signals to a process controller indicating, for example, that one or more articles should be culled and discarded, that the process should be adjusted so as to bring out-of-position components into proper position, or that the process should be adjusted so that subsequent components are brought into proper registration with one another. The comparator may also sound an operator alarm (such as an audible alarm) upon determining that one or more components of an article, or a series of articles, are mispositioned, and may display an image of the article or the components thereof to an operator for monitoring, tracking, or diagnostic purposes.

Figure 4A:
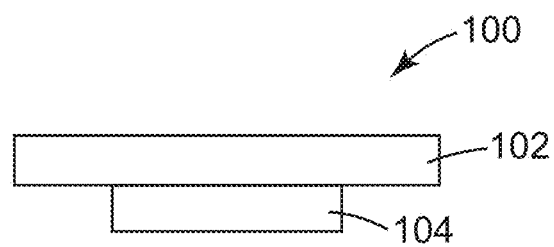
FIGS. 4a and 4b are side and top views of an exemplary article useful for practicing the present disclosure.
Figure 4B:
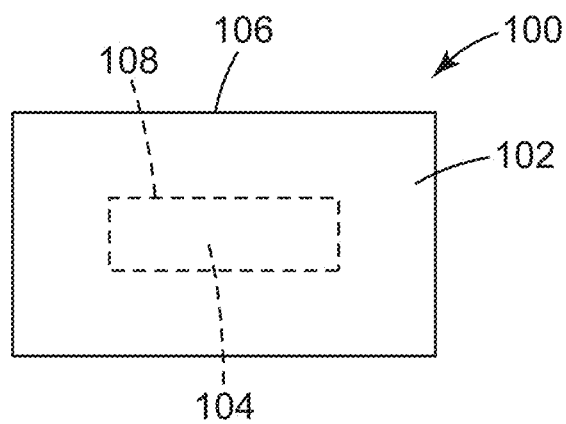
Figure 4C:
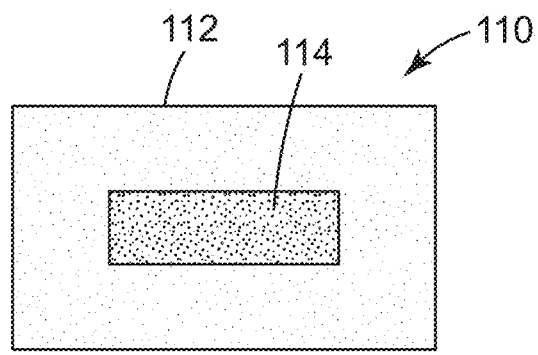
FIG. 4c illustrates an image of the article of FIGS. 4a and 4b produced using some embodiments of the method of detecting a presence or a position of a first component in an article according to the present disclosure.

FIGS. 4a and 4b illustrate an embodiment of an article containing first and second components. As shown in FIG. 4a, the article 100 includes an upper component 102 and a lower component 104 which underlies a portion of the upper component 102. As shown in FIG. 4b, the upper component 102 includes an edge 106, and the lower component 104 includes an edge 108. In some embodiments, both the upper component 102 and the lower component 104 partially inhibit light from passing therethrough (e.g., by absorbing and/or reflecting some of the light). In some embodiments, the upper component 102 does not prevent light from passing through it. In some embodiments, the lower component 104 prevents essentially all detectable light incident thereon from passing therethrough. FIG. 4c illustrates an exemplary two dimensional black-and-white image 110 of the article 100 produced according to the method disclosed herein. In FIG. 4c, darker regions of the image 110 correspond to portions of the article 100 from which the detector received relatively less light. Thus, a position of one contrast variation (i.e., from light to medium) 112 in the image 110 represents a position of the upper component's edge 106. Similarly, a position of another contrast variation (i.e., from medium to dark) 114 in the image 110 represents a position of the lower component's edge 108. In the illustrated embodiment, the entire boundary of the lower component 104 is readily apparent in the image 110 of FIG. 4c.

The lower component 104 appears darker in the image 110 than those portions of the upper component which do not overlie the lower component since the upper component 102 and the lower component 104 provide a cumulative absorptive and/or reflective effect in those regions where the upper component 102 overlies the lower component 104. Therefore, the detector receives less light from that portion of the upper component which overlies the lower component than it does from surrounding portions of the upper component (assuming all portions of the upper component uniformly inhibit the same amount of light from passing therethrough, although this is not a requirement), which results in dark region 114.

By processing the image 110 of FIG. 4c, the image analyzer can identify positions of the aforementioned variations and thus provide identified position data to a comparator. In one embodiment, each pixel or element of the image 110 is assigned a grayscale value, where, when measured in transmission mode, lower grayscale values represent areas from which relatively less light was received by the detector. The image analyzer identifies predefined variations in these grayscale values which correspond to the component positions. The comparator then compares this position data with predefined position data to determine whether the upper component and the lower component are properly positioned in an absolute sense and/or with respect to one another, and output appropriate signals to the process controller. Various software tools may be used by the image analyzer. For example, the software may be designed to analyze the image in multiple locations and from multiple directions.

While FIGS. 4A and 4B illustrate stacked components, the method disclosed herein of detecting a presence or position of a first component in an article may also be useful for detecting partially overlapping components as well as nonoverlapping adjacent components.

The microporous film useful for practicing the methods disclosed herein typically reflects (e.g., scatters) at least one of ultraviolet, visible, or infrared light. In some embodiments, the ability of the microporous film disclosed herein to scatter infrared light allows it to be detected even when it is between other layers of materials in the article.

The level of microporosity in the first component may be adjusted as desired for a given application. For example, it may be useful in some embodiments to have a relatively higher level of microporosity in the first component than in other applications. The level of microporosity can be controlled, for example, by the stretching conditions of the precursor film containing beta-spherulites. Stretching to a higher stretch ratio and stretching at a lower temperature both can increase the level of microporosity in the stretched film, as shown in the Examples, below.

In some embodiments of the method according to the present disclosure, there may be two different components of the article (e.g., a first component and a second component) that both comprise a microporous film of a semi-crystalline polyolefin containing a beta-nucleating agent. In these embodiments, it may be useful for the first and second components to have different levels of microporosity so they are identified as different by the detector. In other embodiments, the second component may include a marker for providing or enhancing its response to the incident light. In these embodiments, the second component need not comprise a microporous film. The marker can be, for example, an infrared marker (e.g., titanium dioxide, barium sulfate, magnesium oxide, calcium carbonate, polytetrafluoroethylene micro beads, and polyolefin microbeads). Using these techniques along with an appropriately selected and positioned light source and detector, the method disclosed herein of detecting the presence or position of a first component in an article can be useful for readily detecting a wide variety of article components, regardless of their position.

The light source may emit multiple wavelengths or bands of wavelengths so as to cause multiple components which respond to different wavelengths of incident light (due to use of infrared markers or otherwise) to exhibit their responses simultaneously, thus permitting their simultaneous detection. In this regard, the detector may include only a single sensor or array of sensors capable of detecting multiple wavelengths or wavelength ranges, and thus multiple components which exhibit different responses to incident light. In other embodiments, the detector may include multiple and distinct detectors, such as infrared cameras, and each of these detectors may be configured (via filters or otherwise) to detect distinct wavelengths or wavelength ranges.

In some embodiments, a set of two or more discrete detectors at optimized observation angles can be configured with different band pass filters, illumination sources, and detection systems enabling simultaneous real-time detection of different product components. Such an approach may advantageously yield true z-directional spatial discrimination, in addition to two-dimensional (i.e., x and y) spatial discrimination. Thus, the individual detectors can be used to detect, for example, individual components each exhibiting a different response to incident light (through use of infrared markers or otherwise) providing detailed x,y,z spatial detection and registration of article components. A single detector with multiple wavelength capabilities can also be used to detect different components exhibiting responses at different wavelengths providing detailed x and y spatial detection.

For any of the embodiments of the method of detecting a presence or a position of a first component in an article according to the present disclosure and the method for preparing a mechanical fastening component for use in an article, the first component may be in the form of a roll, from which smaller patches (for example, mechanical fastener patches) may be cut in a size appropriate to the desired application of the article. The first component may also be a patch that has been cut to a desired size in the methods described herein, and the method for preparing a mechanical fastening component for use in an article can include cutting the film to a desired size.

Methods according to the present disclosure may be particularly useful in the production of absorbent articles, such as disposable diapers, training pants, incontinence devices, and sanitary napkins. In some embodiments of the method disclosed herein of detecting a presence or position of a first component of an article, the first component is a fastening component (e.g., mechanical fastening patch). The method may be useful, for example, to determine the position of the mechanical fastening patch relative to a laminate edge before fastening; which would allow the inspection of the placement of the mechanical fastening patch while the product was still in web form. Accordingly, the method in any of its aforementioned embodiments is useful for detecting the presence or positions of multiple first components in a web process for making articles.

In some embodiments of the methods disclosed herein, the article is a fastening laminate in which the microporous film of the first component is joined to a carrier. The fastening laminates may be useful, for example, as fastening tabs for joining the front waist region and the rear waist region of an absorbent article. In these embodiments, the first component may consist only of the microporous film although this is not a requirement. In fastening laminates, typically the microporous film comprises a microporous film backing and upstanding posts attached to the first surface of the microporous film backing, and the second surface of the backing (i.e., the surface opposite the first surface from which the upstanding posts project) is joined to a carrier. The microporous film may be joined to a carrier, for example, by lamination (e.g., extrusion lamination), adhesives (e.g., pressure sensitive adhesives), or other bonding methods (e.g., ultrasonic bonding, compression bonding, or surface bonding). The carrier may be continuous (i.e., without any through-penetrating holes) or discontinuous (e.g. comprising through-penetrating perforations or pores). In some embodiments of the method disclosed herein of detecting a position of the first component in an article, identifying the predefined response of the first component in the detected light to detect the position of the first component may be carried out before the microporous film is joined to the carrier. If necessary the position of the first component may be adjusted before joining. In other embodiments, identifying the predefined response of the first component in the light received from the irradiated article to detect the position of the first component may be carried out after the microporous film is joined to the carrier. In cases in which laminates not having the correct arrangement of carrier and first component cannot be repositioned, such laminates may be culled and discarded.

In some embodiments of the method of preparing a component for use in an article, the method includes joining the microporous film backing to a carrier, for example, using any of the methods described above. Joining the microporous film backing to a carrier may be carried out before stretching the backing or after stretching the backing, as desired. The backing may also be joined to a carrier during the formation of the backing with upstanding posts.

In some embodiments of the methods disclosed herein, the article is a disposable absorbent article. Some exemplary disposable absorbent articles have at least a front waist region, a rear waist region, and a longitudinal center line bisecting the front waist region and the rear waist region. The first component may be a hook patch or a fastening laminate as described above that is to be bonded to at least one of the front waist region or the rear waist region and may extend outwardly from at least one of the left longitudinal edge or the right longitudinal edge of the absorbent article. In other embodiments, the first component may be a fastening laminate that is an integral ear portion of the disposable absorbent article. In some embodiments, the article may be a disposable absorbent article such as a sanitary napkin. A sanitary napkin typically includes a back sheet that is intended to be placed adjacent to the wearer's undergarment. The first component may be a fastening component to securely attach the sanitary napkin to the undergarment, which mechanically engages with the upstanding posts.

In some embodiments of the method disclosed herein of detecting a position of the first component in an article, identifying the predefined response of the first component in the light received from the irradiated article to detect the position of the first component may be carried out before the first component is joined to the disposable absorbent article. If necessary the position of the first component may be adjusted before joining. In other embodiments, identifying the predefined response of the first component in the light received from the irradiated article to detect the position of the first component may be carried out after the first component is joined to the absorbent article. In cases in which laminates not having the correct arrangement of carrier and first component cannot be repositioned, such laminates may be culled and discarded.

The article or a portion thereof (e.g., the carrier for the fastening laminate described above) may comprise a variety of suitable materials including woven webs, nonwoven webs (e.g., spunbond webs, spunlaced webs, airlaid webs, meltblown web, and bonded carded webs), textiles, plastic films (e.g., single- or multilayered films, coextruded films, laterally laminated films, or films comprising foam layers), and combinations thereof. In some embodiments, the article includes a fibrous material (e.g., a woven, nonwoven, or knit material). The term "nonwoven" when referring to a carrier or web means having a structure of individual fibers or threads which are interlaid, but not in an identifiable manner as in a knitted fabric. Nonwoven fabrics or webs can be formed from various processes such as meltblowing processes, spunbonding processes, spunlacing processes, and bonded carded web processes. In some embodiments, the article comprises multiple layers of nonwoven materials with, for example, at least one layer of a meltblown nonwoven and at least one layer of a spunbonded nonwoven, or any other suitable combination of nonwoven materials. For example, the carrier described above may be a spunbond-meltbond-spunbond, spunbond-spunbond, or spunbond-spunbond-spunbond multilayer material. Or, the article may include a web comprising a nonwoven layer and a dense film layer.

Fibrous materials that provide useful carriers may be made of natural fibers (e.g., wood or cotton fibers), synthetic fibers (e.g., thermoplastic fibers), or a combination of natural and synthetic fibers. One or more zones of the carrier may comprise one or more elastically extensible materials extending in at least one direction when a force is applied and returning to approximately their original dimension after the force is removed.

While detection of the presence or position of a component using an inspection system that relies on detection of infrared light has been described previously, the component contained an IR blocking agent that could either absorb or reflect infrared light. See, e.g., U.S. Pat. No. 6,927,857 (Koele et al.). Surprisingly, the microporous film disclosed herein can block infrared radiation in equivalent or greater amounts than films prepared from similar polyolefin materials and loaded with IR blocking agents. See, for example, the grayscale evaluation for Examples 2 and 5 versus Comparative Example 8 in the Example section below. In some embodiments, the microporous film disclosed herein is essentially free of an IR blocking agent (e.g., an absorbing or reflecting agent). In some embodiments, the microporous film disclosed herein is essentially free of an IR absorbing agent. The microporous film that is "essentially free of" an IR absorbing agent may have no IR absorbing agent or may have an IR absorbing agent in an amount of less than 1, 0.5, or 0.01 percent by weight or less than 10 ppm or 10 ppb. In some embodiments, the microporous film disclosed herein is essentially free of an IR reflecting or scattering agent. The microporous film that is "essentially free of" an IR reflecting or scattering agent may have no IR reflecting or scattering agent or may have an IR reflecting or scattering agent in an amount of less than 2, 1.5, 1, or 0.5 percent by weight. In some of these embodiments, the IR reflecting or scattering agent is selected from the group consisting of titanium dioxide, barium sulfate, magnesium oxide, calcium carbonate, polytetrafluoroethylene microbeads, and polyolefin microbeads.

Eliminating or at least partially eliminating the use of IR blocking agents, which is possible in the methods according to the present disclosure because of the nature of the microporous film described herein, may be useful, for example, for reducing material cost and eliminating expensive processes necessary when using IR blockers (e.g., coextrusion processes). Also, the microporous films useful for practicing the methods disclosed herein are stretched, which also can provide a reduction in material cost. For example, less thermoplastic material may be needed in a stretched first component than when the first component is not stretched. When traditional IR blocking agents are used in stretched thermoplastic films, their effectiveness is usually dependent on their concentration in the film, and the stretching results in decreased effectiveness. See, for example, Comparative Examples 9 and 10, below.

For embodiments in which the first component comprises a microporous film backing with upstanding surface structures (e.g., posts) or in which the first component is a mechanical fastening component, there are additional advantages over unstructured film-containing first components. While unstructured films comprising polypropylene with beta-spherulites have been demonstrated to become microporous and increase in opacity upon stretching, high stretch ratios are reported to be required to achieve a desirable level of porosity or opacity. In some cases, stretch ratios exceeding 5:1, 10:1 or even 20:1 are reported. See, e.g., U.S. Pat. No. 6,815,048 (Davidson et al.), U.S. Pat. Appl. Pub. No. 2006/0177632 (Jacoby), and UK Pat. App. GB 2323325, published Sep. 23, 1998. In some cases, biaxial stretching is preferred. Unexpectedly, a structured film comprising a semi-crystalline polyolefin and a beta-nucleating agent (e.g., which may in some embodiments have upstanding posts on a backing) can be stretched at relatively low stretch ratios, and in some cases, in only one direction, to achieve high levels of porosity and opacity useful for providing a useful light blocking effect. High levels of porosity and opacity are achieved with low stretch ratios even in the absence of other cavitating agents such as calcium carbonate.

SELECTED EMBODIMENTS OF THE DISCLOSURE

In a first embodiment, the present disclosure provides a method of detecting a presence or a position of a first component in an article, the method comprising:

irradiating the article with incident light, wherein the first component has a predefined response to the incident light;

detecting light received from the irradiated article; and identifying the predefined response of the first component in the light received from the irradiated article to detect the presence or the position of the first component, wherein the first component comprises a microporous film comprising a semi-crystalline polyolefin and a beta-nucleating agent.

In a second embodiment, the present disclosure provides the method of the first embodiment, wherein the microporous film is a structured film.

In a third embodiment, the present disclosure provides the method of the second embodiment, wherein the microporous film comprises a microporous film backing and upstanding posts attached to the microporous film backing.

In a fourth embodiment, the present disclosure provides the method of the third embodiment, wherein the upstanding posts have lower porosity than the film backing.

In a fifth embodiment, the present disclosure provides the method of the third or fourth embodiment, wherein a density of the upstanding posts is in a range from 2 per square centimeter to 1182 per square centimeter.

In a sixth embodiment, the present disclosure provides the method of any one of the third to fifth embodiment, wherein the first component is a mechanical fastening patch.

In a seventh embodiment, the present disclosure provides the method of any one of the first to sixth embodiments, wherein the incident light and the light received from the from the irradiated article comprises infrared light, and wherein the first component is essentially free of an infrared radiation blocking agent.

In an eighth embodiment, the present disclosure provides the method of the seventh embodiment, wherein the first component is essentially free of an infrared radiation blocking agent selected from the group consisting of titanium dioxide, barium sulfate, magnesium oxide, calcium carbonate, polytetrafluoroethylene microbeads, and polyolefin microbeads.

In a ninth embodiment, the present disclosure provides the method of any one of the first to eighth embodiments, wherein the semi-crystalline polyolefin comprises polypropylene.

In a tenth embodiment, the present disclosure provides the method of the ninth embodiment, wherein the semi-crystalline polyolefin comprises at least one of propylene homopolymer, a copolymer of propylene and other olefins, or a blend of a polypropylene homopolymer and a different polymer.

In an eleventh embodiment, the present disclosure provides the method of any one of the first to tenth embodiments, wherein the beta-nucleating agent is present in the first component in a range of 1 part per million to 10,000 parts per million, based on the weight of the first component.

In a twelfth embodiment, the present disclosure provides the method of any one of the first to eleventh embodiments, wherein the beta-nucleating agent is selected from the group consisting of gamma quinacridone; an aluminum salt of quinizarin sulphonic acid; dihydroquinoacridin-dione; quinacridin-tetrone; triphenenol ditriazine; the combination of calcium carbonate and organic acids; the combination of calcium stearate and pimelic acid; calcium silicate; dicarboxylic acid salts of metals of Group IIA of the periodic table; delta-quinacridone; diamides of adipic or suberic acids; calcium salts of suberic or pimelic acid; indigosol or cibantine organic pigments; quinacridone quinone; N',N'-dicyclohexil-2,6-naphthalene dicarboxamide; antraquinone red pigments; and bis-azo yellow pigments.

In a thirteenth embodiment, the present disclosure provides the method of any one of the first to the twelfth embodiments, wherein the first component has a percent transmittance up to 65 percent in a wavelength range of 250 nanometers to 2250 nanometers.

In a fourteenth embodiment, the present disclosure provides the method of any one of the first to thirteenth embodiments, wherein the microporous film further comprises a colorant.

In a fifteenth embodiment, the present disclosure provides the method of any one of the first to fourteenth embodiments, wherein the first component has a grayscale value of up to 40.

In a sixteenth embodiment, the present disclosure provides the method of the any one of the first to fifteenth embodiments, wherein the first component comprises a multilayer film with at least one layer comprising the microporous film.

In a seventeenth embodiment, the present disclosure provides the method of any one of the first to sixteenth embodiments, wherein the article is a disposable absorbent article.

In an eighteenth embodiment, the present disclosure provides the method of any one of the first to seventeenth embodiments, wherein the article is in a moving collection of articles.

In a nineteenth embodiment, the present disclosure provides the method of the eighteenth embodiment, wherein at least some of the articles in the moving collection of articles are interconnected.

In a twentieth embodiment, the present disclosure provides the method of any one of the first to nineteenth embodiments, wherein detecting includes producing an image from the light received from the irradiated article, and wherein identifying includes identifying the predefined response of the first component in the image to detect the presence or the position of the first component.

In a twenty-first embodiment, the present disclosure provides the method of any one of the first to twentieth embodiments, further comprising comparing the detected position of the first component with reference data to determine whether the first component is properly positioned in the article.

In a twenty-second embodiment, the present disclosure provides the method of any one of the first to twenty-first embodiments, wherein the incident light is generated from a light source, and wherein the light received from the irradiated article is transmitted through the article to a detector.

In a twenty-third embodiment, the present disclosure provides a method for preparing a mechanical fastening component for use in an article, the method comprising:
    extruding a melt of a polymer composition comprising polypropylene and a beta-nucleating agent in the presence of a tool to provide a film backing with upstanding fastening elements;
    cooling at least a portion of the film backing to a temperature sufficient to form beta-spherulites; and
    stretching the film backing containing the beta-spherulites to provide a microporous film backing with sufficient porosity to allow the mechanical fastening component to be detected when the article is subjected to an inspection system comprising a light source and a light detector.

In a twenty-fourth embodiment, the present disclosure provides the method of the twenty-third embodiment, wherein the light source transmits light through the article to the light detector.

In a twenty-fifth embodiment, the present disclosure provides the method of the twenty-third or twenty-fourth embodiments, wherein the temperature is in a range from 90° C. to 120° C.

In a twenty-sixth embodiment, the present disclosure provides the method of the twenty-fifth embodiment, wherein the stretching is carried out at a second temperature in a range from 50° C. to 90° C.

In a twenty-seventh embodiment, the present disclosure provides the method of any one of the twenty-third to twenty-sixth embodiments, wherein the stretching is monoaxial.

In a twenty-eighth embodiment, the present disclosure provides the method of any one of the twenty-third to twenty-seventh embodiments, wherein stretching is carried out to provide a total stretch ratio of up to 3:1.

In a twenty-ninth embodiment, the present disclosure provides the method of the any one of the twenty-third to twenty-eighth embodiments, wherein the stretching is in the machine direction.

In a thirtieth embodiment, the present disclosure provides the method of the any one of the twenty-third to twenty-ninth embodiments, wherein the stretching provides at decrease in grayscale value measurement in transmission mode of at least 25 percent.

EXAMPLES

Materials

Film grade polypropylene (PP) copolymer, a polypropylene impact copolymer, was obtained from the Dow Chemical Company, Midland, Mich., under the trade designation "DOW C700-35N POLYPROPYLENE RESIN". The polymer density was reported to be 0.902 g/cc as measured according to ASTM D972 and the melt flow index (MFI) was reported to be 35 (at 230° C. and under the load of 2.16 kg) as measured according to ASTM D1238. The beta nucleating master batch was obtained from the Mayzo Corporation, Alpharetta, Ga., under the trade designation "MPM 1114". The beta nucleating master batch was pelletized and contained a high performance beta nucleant formulation dispersed in a polypropylene homopolymer resin.

Sample Preparation

Structured films were prepared having a substantially continuous backing of thermoplastic resin and integral with the backing was an array of upstanding posts. The upstanding posts were capped. The cap shapes for Examples 1-7 and Comparative Examples 1-10 were oval and deformed using the procedure described in U.S. Pat. No. 6,132,660 (Kampfer) to provide "hook heads with downwardly projecting fiber engaging portions". In Tables 1 and 2, the total thickness, film backing thickness, basis weight, cap diameter in the cross direction (CD), and cap diameter in the machine direction (MD) are recorded for Examples 1-7 and Comparative Examples 1-10.

Example 1

Structured films were prepared by feeding a stream of C700-35N Polyproplyene Resin (98 weight %) and the beta nucleating master batch (2 weight %) through a 2 inch single screw extruder. Barrel zones 1-7 were set at 176° C., 170° C., 180° C., 190° C., 200° C., 218° C. and 218° C. respectively. The molten resin was then fed through a sheet die to a rotating cylindrical mold. The temperature of the die was set at 218° C. and the temperature of cylindrical mold was set at 90° C. The screw speed was set at 80 rpm. Rapid flow of the resin into the mold cavities induced molecular orientation parallel to the direction of flow. The mold was water-cooled to provide rapid quenching that maintained the orientation in the polymer. The post density was 5200 posts per square inch (806 posts per square centimeter) arranged in a staggered array and the post shape was conical. The web was fed directly into a cap forming apparatus. The posts were capped with oval shaped caps using the procedure described in U.S. Pat. No. 5,845,375 (Miller et al.). The caps were subsequently deformed using the procedure described in U.S. Pat. No. 6,132,660 (Kampfer).

Example 2

The structured film with capped posts was prepared using the same processing conditions as in Example 1. In addition, the structured film from Example 1 was stretched in the machine direction using a draw ratio of 2:1 by passing the sample through a pair of rolls arranged with one roll on top of the other roll. The roll temperatures were set at 130° C.

Example 3

The structured film with capped posts was prepared using the same processing conditions described in Example 2 with the exception that during the draw the roll temperatures were set at 70° C. instead of 130° C.

Example 4

The structured film with capped posts was prepared using the same processing conditions described in Example 2 with the exception that during the draw the roll temperatures were set at 60° C. instead of 130° C.

Example 5

The structured film with capped posts was prepared using the same processing conditions described in Example 2 with the exception that the draw ratio was set at 3:1 instead of 2:1.

Example 6

The structured film with capped posts was prepared using the same processing conditions described in Example 5 with the exception that during the draw the roll temperatures were set at 70° C. instead of 130° C.

Example 7

The structured film with capped posts was prepared using the same processing conditions described in Example 5 with the exception that during the draw the roll temperatures were set at 60° C. instead of 130° C.

Comparative Example 1

The structured film with capped posts was prepared according to Example 1 with the exception that the beta nucleating master batch was eliminated from the feed stream.

Comparative Example 2

The structured film with capped posts was prepared using the same processing conditions as in Comparative Example 1. In addition, the structured film from Comparative Example 1 was stretched in the machine direction using a draw ratio of 2:1 by passing the sample through a pair of rolls arranged with one roll on top of the other roll. The roll temperatures were set at 130° C.

Comparative Example 3

The structured film with capped posts was be prepared using the same processing conditions described in Comparative Example 2 with the exception that during the draw the roll temperatures were set at 70° C. instead of 130° C.

Comparative Example 4

The structured film with capped posts was be prepared using the same processing conditions described in Comparative Example 2 with the exception that during the draw the roll temperatures were set at 60° C. instead of 130° C.

Comparative Example 5

The structured film with capped posts was prepared using the same processing conditions described in Comparative Example 2 with the exception that the draw ratio was set at 3:1 instead of 2:1.

Comparative Example 6

The structured film with capped posts was prepared using the same processing conditions described in Comparative Example 5 with the exception that during the draw the roll temperatures were set at 70° C. instead of 130° C.

Comparative Example 7

The structured film with capped posts was prepared using the same processing conditions described in Comparative Example 5 with the exception that during the draw the roll temperatures were set at 60° C. instead of 130° C.

Comparative Example 8

The structured film with capped posts was prepared according to Comparative Example 1 with the exception that a titanium dioxide masterbatch (obtained from Clariant Corporation, Minneapolis, Minn.) was added to the feed stream. The titanium dioxide masterbatch was 50% by weight titanium dioxide, and the masterbatch was added at 2% by weight, based on the total weight of the polypropylene and the masterbatch.

Comparative Example 9

The structured film with capped posts was prepared according to Comparative Example 8. In addition, the structured film from Comparative Example 8 was stretched in the machine direction using a draw ratio of 2:1 by passing the sample through a pair of rolls arranged with one roll on top of the other roll. The roll temperatures were set at 130° C.

Comparative Example 10

The structured film with capped posts was prepared using the same processing conditions described in Comparative Example 9 with the exception that the draw ratio was set at 3:1 instead of 2:1.

TABLE 1

|  | Total Thickness (μm) | Film Backing Thickness (μm) | Basis Weight (gsm) | Cap Diameter in CD (μm) | Cap Diameter in MD (μm) |
| --- | --- | --- | --- | --- | --- |
| Example 1 | 315 | 97 | 112 | 328 | 264 |
| Example 2 | 281 | 63 | 60.7 | 330 | 258 |
| Example 3 | 285 | 67 | 55.3 | 325 | 255 |
| Example 4 | 282 | 64 | 53.9 | 335 | 250 |
| Example 5 | 262 | 44.3 | 51.5 | 315 | 240 |
| Example 6 | 264 | 45.9 | 48.9 | 320 | 235 |
| Example 7 | 263 | 45.2 | 47.6 | 313 | 250 |

TABLE 2

|  | Total Thickness (μm) | Film Backing Thickness (μm) | Basis Weight (gsm) | Cap Diameter in CD (μm) | Cap Diameter in MD (μm) |
| --- | --- | --- | --- | --- | --- |
| Comparative Example 1 | 327 | 97.5 | 114.5 | 325 | 211 |
| Comparative Example 2 | 287 | 57.2 | 71.8 | 308 | 223 |
| Comparative Example 3 | 285 | 55 | 72.1 | 320 | 223 |
| Comparative Example 4 | 286 | 56.3 | 72.5 | 315 | 210 |
| Comparative Example 5 | 263 | 33.8 | 49.1 | 310 | 200 |
| Comparative Example 6 | 265 | 35.2 | 50.5 | 317 | 225 |
| Comparative Example 7 | 266 | 36.5 | 49.5 | 325 | 213 |
| Comparative Example 8 | 328 | 95.2 | 120.2 | 325 | 215 |
| Comparative Example 9 | 288 | 55.4 | 73.2 | 314 | 229 |
| Comparative Example 10 | 267 | 33.7 | 53.4 | 320 | 227 |

Testing

Optical Microscopy

Figure 3A:
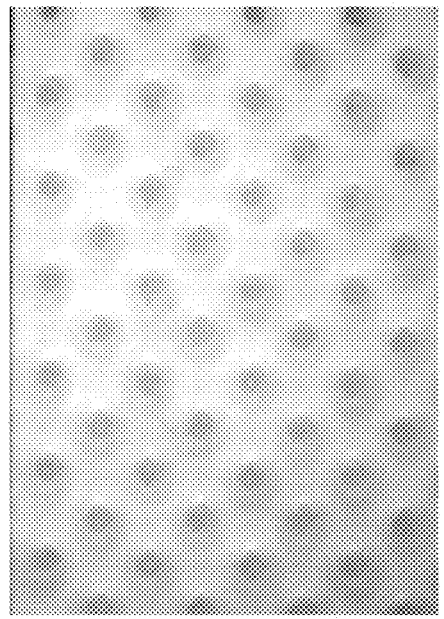
FIG. 3a is an optical microscope image of a top view of Example 4, useful for practicing the methods according to the present disclosure.
Figure 3B:
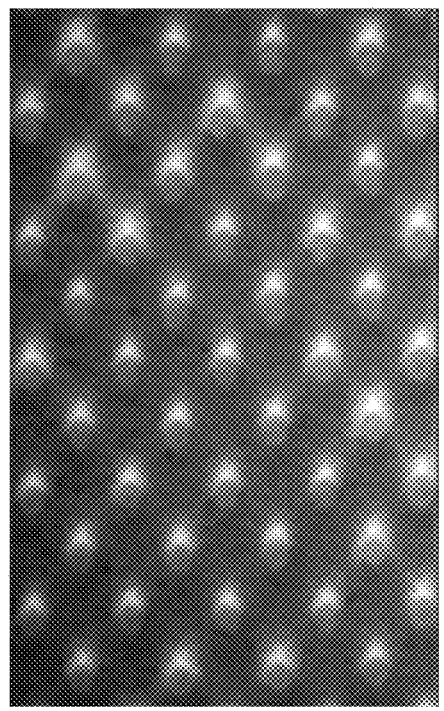
FIG. 3b is an optical microscope image of a top view of Comparative Example 4, which is a stretched structured film containing no beta-nucleating agent.

Optical microscope images were taken for Example 4 and Comparative Example 4 and are shown in FIGS. 3a and 3b, respectively. A Keyence VHS-500 model digital microscope was used, and the samples were placed against a black background when the pictures were taken.

Grayscale Measurement

Grayscale measurements of the structured films of Examples 1-7 And Comparative Examples 1-10 were collected using an IMPACT A20 digital camera (PPT Vision, Bloomington, Minn.) equipped with a CMOS (complementary metal oxide semiconductor) image sensor and the IMPACT Software Suite. The one meter long samples in the machine direction (MD) were held under tension by hand between two rollers. The samples were illuminated from behind the film side (i.e. non-post side) with a 940 nm wavelength light source. The detection camera was mounted approximately five feet above the structured film samples with the post side facing the camera. The grayscale intensity measurements were taken in the transmission mode using a numeric scale ranging from 0 (high opacity) to 255 (low opacity). The grayscale intensity was recorded at three different MD sampling points. The mean values were calculated and are reported in Tables 3-4.

TABLE 3

| Sample | Mean Grayscale Intensity | Sample | Mean Grayscale Intensity |
| --- | --- | --- | --- |
| Example 1 | 48 | Comparative Example 1 | 41 |
| Example 2 | 29 | Comparative Example 2 | 52 |
| Example 3 | 20 | Comparative Example 3 | 49 |
| Example 4 | 12 | Comparative Example 4 | 45 |
| Example 5 | 13 | Comparative Example 5 | 88 |
| Example 6 | 13 | Comparative Example 6 | 61 |
| Example 7 | 7 | Comparative Example 7 | 63 |

TABLE 4

| Sample | Mean Grayscale Intensity | Sample | Mean Grayscale Intensity |
| --- | --- | --- | --- |
| Example 1 | 48 | Comparative Example 1 | 41 |
| Example 2 | 29 | Comparative Example 2 | 52 |
| Example 5 | 13 | Comparative Example 5 | 88 |
|  |  | Comparative Example 8 | 30 |
|  |  | Comparative Example 9 | 39 |
|  |  | Comparative Example 10 | 121 |

UV/Vis/NIR Spectroscopy

The transmittance and reflectance of UV/Vis/NIR (ultraviolet/visible/near infrared) radiation by Examples 1-7 and Comparative Examples 1-10 was measured using a Lambda 1050 UV/Vis/NIR spectrometer (Perkin Elmer, San Jose, Calif.) with an integrating sphere. Transmittance and reflectance spectra were recorded from 250 to 2500 nm in 5 nm increments. The integrating sphere had a diameter of 15 cm. Samples were held at 90 degrees to the incident radiation for the transmission mode and at 8 degrees in the reflectance mode. An air reference was used. For the transmission measurements, the samples are mounted with the non-post side facing the incident radiation. The percent reflectance data was collected without using the white plate (i.e. light trap) and the film side (non-post side) of the sample was mounted to face the incident beam. For analysis, the spectra were divided into three regions [250-380 nm (ultraviolet region), 380-760 nm (visible region) and 760-2250 nm (near infrared region)]. The range of values recorded for percent transmittance and percent reflectance in each region are reported in Tables 5-8.

TABLE 5

| | % Transmittance Range | | |
|---|---|---|---|
| | 250-380 nm | 380-760 nm | 760-2250 nm |
| Example 1 | 40-66 | 67-74 | 35-82 |
| Example 2 | 30-48 | 48-53 | 26-60 |
| Example 3 | 12-26 | 26-33 | 12-44 |
| Example 4 | 8-19 | 19-26 | 11-37 |
| Example 5 | 13-25 | 25-32 | 19-44 |
| Example 6 | 14-25 | 25-31 | 19-44 |
| Example 7 | 9-19 | 19-26 | 16-39 |

TABLE 6

| | % Transmittance Range | | |
|---|---|---|---|
| | 250-380 nm | 380-760 nm | 760-2250 nm |
| Comparative Example 1 | 48-70 | 69-75 | 41-80 |
| Comparative Example 2 | 62-76 | 76-80 | 50-85 |
| Comparative Example 3 | 44-62 | 63-67 | 44-76 |
| Comparative Example 4 | 39-54 | 54-58 | 38-67 |
| Comparative Example 5 | 53-64 | 64-68 | 54-78 |
| Comparative Example 6 | 47-59 | 59-63 | 50-73 |
| Comparative Example 7 | 42-50 | 53-57 | 45-66 |
| Comparative Example 8 | 6-31 | 10-55 | 38-80 |
| Comparative Example 9 | 14-40 | 19-61 | 51-82 |
| Comparative Example 10 | 26-50 | 32-68 | 63-87 |

TABLE 7

| | % Reflectance Range | | |
|---|---|---|---|
| Example | 250-380 nm | 380-760 nm | 760-2250 nm |
| Example 1 | 17-32 | 29-32 | 3-29 |
| Example 2 | 39-50 | 47-50 | 22-59 |
| Example 3 | 62-73 | 69-73 | 29-69 |
| Example 4 | 70-79 | 76-79 | 38-77 |
| Example 5 | 65-75 | 66-74 | 35-69 |
| Example 6 | 72-81 | 75-80 | 41-75 |
| Example 7 | 66-75 | 69-74 | 65-69 |

TABLE 8

| | % Reflectance Range | | |
|---|---|---|---|
| Example | 250-380 nm | 380-760 nm | 760-2250 nm |
| Comparative Example 1 | 18-31 | 26-30 | 1-26 |
| Comparative Example 2 | 19-26 | 22-25 | 6-22 |
| Comparative Example 3 | 32-45 | 41-44 | 12-41 |
| Comparative Example 4 | 26-39 | 35-38 | 10-36 |
| Comparative Example 5 | 30-36 | 32-36 | 14-32 |
| Comparative Example 6 | 32-40 | 35-38 | 14-35 |
| Comparative Example 7 | 34-43 | 38-40 | 17-34 |
| Comparative Example 8 | 4-44 | 14-57 | 4-46 |
| Comparative Example 9 | 6-42 | 16-51 | 7-40 |
| Comparative Example 10 | 7-37 | 17-42 | 8-32 |

This disclosure may take on various modifications and alterations without departing from its spirit and scope. Accordingly, this disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A method of detecting a presence or a position of a first component in an article, the method comprising:
    irradiating the article with incident light, wherein the first component has a predefined response to the incident light;
    detecting light received from the irradiated article; and
    identifying the predefined response of the first component in the light received from the irradiated article to detect the presence or the position of the first component,
    wherein the first component comprises a microporous film comprising a semi-crystalline polyolefin and a beta-nucleating agent,
    wherein the incident light and the light received from the from the irradiated article comprises infrared light, and
    wherein the first component is free of an infrared absorbing agent and free of an infrared radiation blocking agent selected from the group consisting of titanium dioxide, barium sulfate, magnesium oxide, calcium carbonate, polytetrafluoroethylene microbeads, and polyolefin microbeads.

2. The method of claim 1, wherein the microporous film is a structured film.

3. The method of claim 2, wherein the microporous film comprises a microporous film backing and upstanding posts attached to the microporous film backing.

4. The method of claim 3, wherein the first component is a mechanical fastening patch.

5. The method of claim 1, wherein the first component has a percent transmittance up to 65 percent in a wavelength range of 250 nanometers to 2250 nanometers.

6. The method of claim 1, wherein the first component has a grayscale value of up to 40.

7. The method of claim 1, wherein the semi-crystalline polyolefin comprises polypropylene.

8. The method of claim 1, wherein the semi-crystalline polyolefin comprises at least one of propylene homopolymer, a copolymer of propylene and other olefins, or a blend of a polypropylene homopolymer and a different polymer.

9. The method of claim 1, wherein the beta-nucleating agent is present at 1 part per million to 10,000 parts per million, based on the weight of the first component.

10. The method of claim 1, wherein the article is in a moving collection of articles.

11. The method of claim 10, wherein at least some of the articles in the moving collection of articles are interconnected.

12. The method of claim 1, wherein the first component comprises a multilayer film with at least one layer comprising the microporous film.

13. The method of claim 1, wherein the article is a disposable absorbent article.

14. The method of claim 1, wherein detecting includes producing an image from the light received from the irradiated article, and wherein identifying includes identifying the predefined response of the first component in the image to detect the presence or the position of the first component.

15. The method of claim 1, further comprising comparing the detected position of the first component with reference data to determine whether the first component is properly positioned in the article.

16. The method of claim 1, wherein the incident light is generated from a radiation source, and wherein the light received from the irradiated article is transmitted through the article to a detector.

* * * * *